United States Patent

Chalupa

[11] Patent Number: 6,023,141
[45] Date of Patent: Feb. 8, 2000

[54] METHOD AND APPARATUS FOR ELECTRONICALLY COMMUTATING AN ELECTRIC MOTOR

[75] Inventor: Leos Chalupa, Jemnice, Czech Rep.

[73] Assignee: Motorola, Inc., Schaumburg, Ill.

[21] Appl. No.: 09/311,074

[22] Filed: May 13, 1999

[51] Int. Cl.$^7$ .................................. H02P 6/18; H02P 6/20
[52] U.S. Cl. .......................... 318/439; 318/254; 318/430
[58] Field of Search ................................... 318/138, 254, 318/430, 431, 439

[56] References Cited

U.S. PATENT DOCUMENTS

| | | | |
|---|---|---|---|
| 4,751,447 | 6/1988 | Okachi | 318/772 |
| 5,017,845 | 5/1991 | Carobolante et al. | 318/138 |
| 5,233,275 | 8/1993 | Danino | 318/254 |
| 5,327,053 | 7/1994 | Mann et al. | 318/254 |
| 5,534,763 | 7/1996 | Williams et al. | 318/799 |
| 5,650,699 | 7/1997 | Tang et al. | 318/431 |
| 5,663,618 | 9/1997 | Adachi et al. | 318/254 |
| 5,672,948 | 9/1997 | Cohen et al. | 318/603 |
| 5,751,128 | 5/1998 | Chalupa et al. | 318/439 |

FOREIGN PATENT DOCUMENTS 0735660   10/1996   European Pat. Off. .......... H02P 1/00

OTHER PUBLICATIONS

"Sensorless Position and Speed Control of a Brushless DC Motor from Start–up to Nominal Speed", L. Cardoletti et al. From the Swiss Federal Institute of Technology, Lausanne, Switzerland (EPFL), *EPE Journal*, vol. 2, No. 1, Mar. 1992.

*Primary Examiner*—Bentsu Ro
*Attorney, Agent, or Firm*—Anthony M. Martinez

[57] ABSTRACT

In a method for operating a brushless motor with commutated stator excitation and permanent rotor field, the stator is initially energized partly. Depending on the polarity of the back electromagnetic force (EMF) in the non-energized stator coil at a predetermined time point ($t(n)+T_{OFF}$) and on the occurrence of a EMF zero-crossing event in a following time frame ($T_{MONITOR}$), the next stator commutation ($t'(n+1)$) is scheduled. Thereby, three cases (i)(ii)(iii) are distinguished and detected events ($\tau(n-1)$) in previous commutation cycles (n-1) are taken into account.

14 Claims, 3 Drawing Sheets

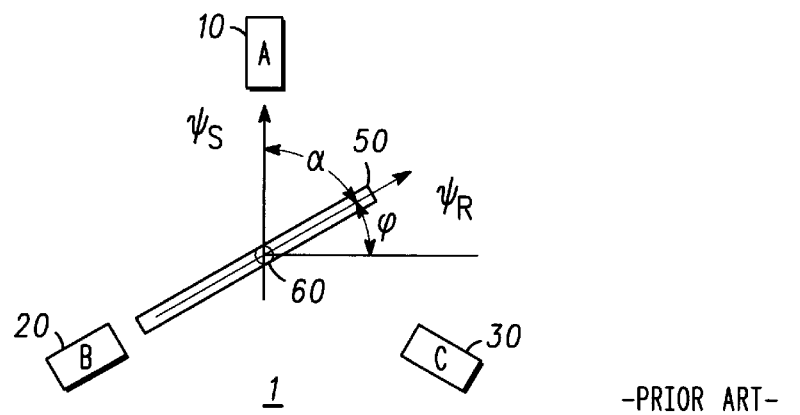
FIG. 1 -PRIOR ART-
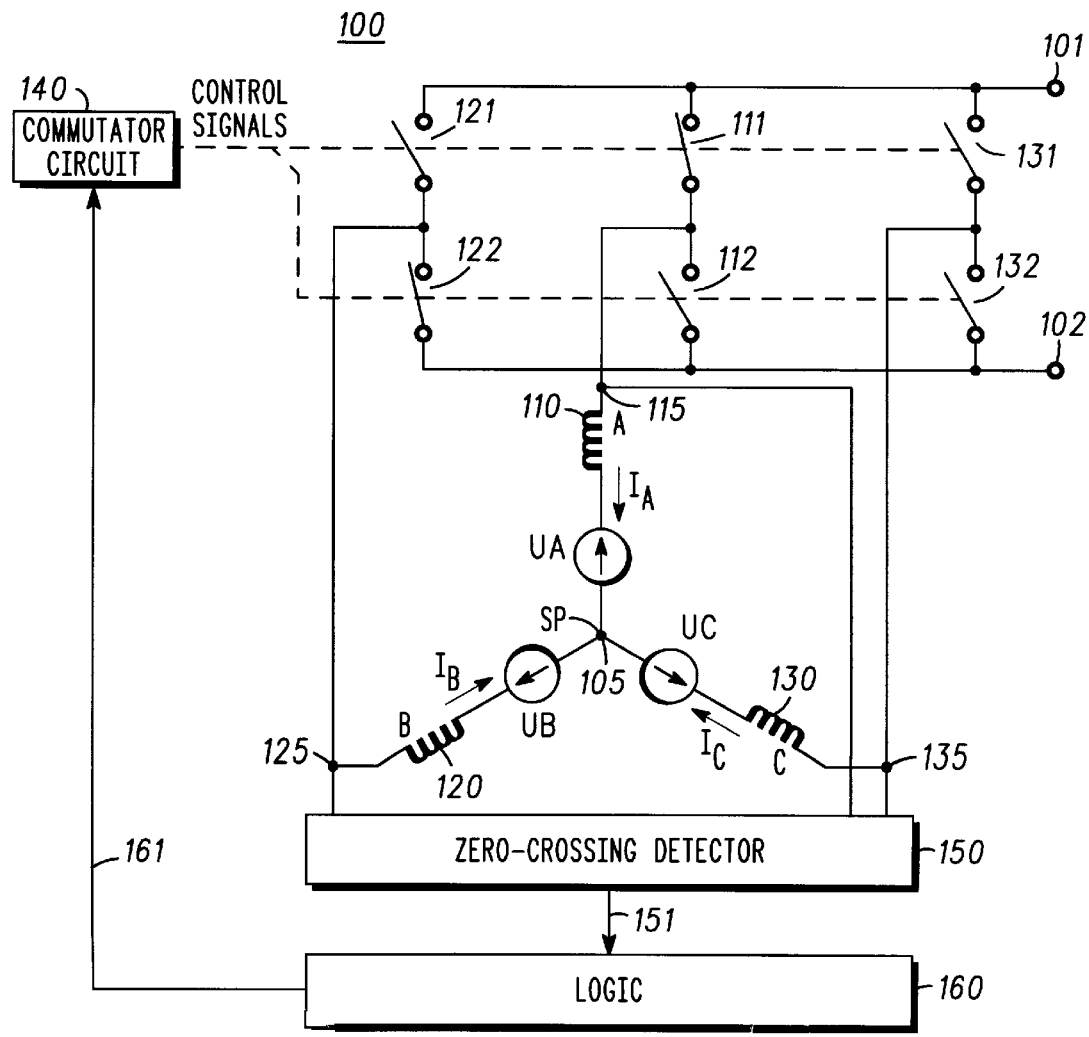
FIG. 2

METHOD AND APPARATUS FOR ELECTRONICALLY COMMUTATING AN ELECTRIC MOTOR

FIELD OF THE INVENTION

The present invention generally relates to techniques of electronically commutating an electric motor, and, more particularly, to a motor for consumer appliances and a method to operate the motor.

BACKGROUND OF THE INVENTION

FIG. 1 illustrates a simplified diagram of well-known brushless motor 1 by way of a non-limiting example. Motor 1 has a stator with stator coils 10 ("A"), 20 ("B") and 30 ("C") and has rotor 50 turning in center 60. The number of M=3 coils is convenient for explanation, but not necessary. Brushless motors are known for other numbers, such as M=1 or M>3. Preferably, rotor 50 is a permanent magnet. Stator 10/20/30 and rotor 50 can be arranged in a different manner well known to a person of skill in the art.

A controller (not shown) sequentially applies currents ("energizing", "exciting") to each of the coils. Stator coils 10, 20, and 30 thereby establish a rotating magnetic field $\psi_S$ (index "S" for "stator", underscoring for "vector") which acts on the permanent magnetic field $\psi_R$ of the rotor ((index "R")). The resulting mechanical torque moves the rotor and any other mechanical load attached thereto.

The excitation of the coils can be unipolar (only a single current direction for each coil) or bipolar (alternative current directions). By providing coil currents $I_A$, $I_B$ and $I_C$ (not illustrated in FIG. 1) to coils A, B, and C, the motor controller has to ensure that rotor 50 reaches a rated speed within a predetermined time from stand-still; that the rotor only moves in a predetermined sense; and that rotor 50 provides a predetermined torque at start and at a rated speed. The torque has a maximum when the field angle $\alpha(\psi_S,\psi_R)$ is about $\pi/2\pm\pi/6$. The mechanical load at rotor 50 is usually unknown.

It is possible to determine the position (e.g., $\phi$ in angular coordinates) of rotor 50 in relation to stator 10/20/30 by monitoring voltages $U_A$, $U_B$, $U_C$ (not illustrated) induced in coils A, B and C ("back electromagnetic force—back EMF").

Value (e.g., millivolts) and direction (+−) of $U_A$, $U_B$ and $U_C$ are determined by the actual position ($\phi$) and the rotation speed (d$\phi$/dt) of rotor 50. At rated rotor speed $U_A$, $U_B$, $U_C$ behave like the voltages generated in a 3-phase-AC-generator. However, at stand-still (zero speed d$\phi$/dt=0), $U_A$, $U_B$ and $U_C$ are also zero and the position ($\phi$) is arbitrary (hence unknown to the motor control).

U.S. Pat. No. 5,233,275 to Danino [1] teaches a circuit which detects zero-crossing of $U_A$, $U_B$ or $U_C$ to which power is currently being supplied and uses that detection as positional information. U.S. Pat. No. 5,017,845 to Carobolante et al. [2] teaches sampling magnitude (volts) and sign of the slope (dU/dt) of the back EMF of the coils which are not energized (floating). U.S. Pat. No. 5,751,128 to Chalupa et al. [3] (same assignee as for the present application) teaches to measure the time duration between two consecutive zero-crossings of the EMF and to derive control information therefrom.

When the motor is being started up, it is still difficult to estimate to most effective commutating time points. The present invention seeks to provide an improved method and apparatus for electronically commutating a motor and to avoid disadvantages and limitations of the prior art.

BRIEF DESCRIPTION OF THE DRAWINGS

FIG. 1 illustrates a simplified diagram of a brushless motor with stator coils and a rotor magnet;

FIG. 2 illustrates a simplified block diagram of an arrangement of stator coils, commutation switches, a zero-crossing detector, a commutator circuit and a logic according to an apparatus of the present invention;

DETAILED DESCRIPTION OF A PREFERRED EMBODIMENT

Figure 3:
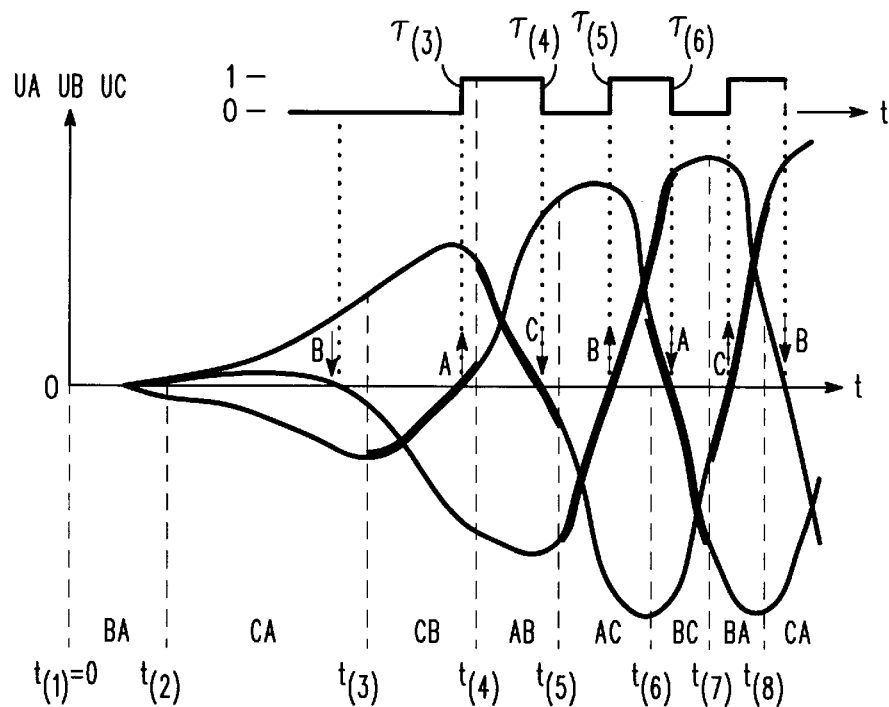
FIG. 3 illustrates a simplified time diagram of commutation states (patterns) of a stator excitation and induced voltages $U_A$, $U_B$, $U_C$ resulting from an actual rotor movement.

FIG. 2 illustrates a simplified block diagram of arrangement 100 of M=3 stator coils 110 ("coil A"), 120 ("coil B") and 130 ("coil C"), commutation switches 111/112, 121/122 and 131/132, zero-crossing detector 150, commutator circuit 140 and logic 160. By providing a rotor, a person of skill in the art is able to obtain a motor. By way of example, coils A, B and C have common terminals star-connected to star point 105. Voltage sources $U_A$, $U_B$ and $U_C$ are indicative of the above mentioned induced voltages. For convenience, ohmic resistances in the coils are not illustrated or considered. Terminal 115 of coil 110 is switched either to reference line 101 (e.g., plus of a d.c. supply voltage) via switch 111 or to reference line 102 (e.g., minus of the d.c. supply voltage) via switch 112. Terminal 125 of coil B is switched either to line 101 via switch 121 or to line 102 via switch 122. Terminal 135 of coil C is switched either to line 101 via switch 131 or to line 102 via switch 132.

Commutator circuit 140 controls the six switches by control signals 141. A commutating sequence is illustrated by way of example in FIG. 3. The switches are implemented, for example, by field effect transistors (FETs) or by bipolar transistors. Coil terminals 115, 125 and 135 are coupled to inputs of zero-crossing detector 150.

Zero-crossing detector 150 monitors the voltage differences between terminals 115, 125 and 135 and issues control signal 151 comprising information about zero-crossing events and the polarity of $U_A$, $U_B$, and $U_C$. Detector 150 can optionally comprise low pass filters to filter out unwanted spurious signals. Control signal 151 is explained with more detail in FIGS. 3–4. Zero-crossing detectors are known in the art (e.g., described in reference [3]).

Logic 160 receiving control signal 151 from detector 150 operates according to a method of the present invention (details later) and issues a commutation signal 161 at an optimized time point to commutator circuit 140. Persons of skill in the art are able to implement coils 110, 120 and 130, commutator circuit 140 and detector 150 without the need of further explanation herein. Although elements 140, 150 and 160 are illustrated by separate functional blocks, it is understood that a person of skill in the art can implement them in a usual microprocessor. This approach has several advantages, among them the possibility to configure arrangement 100 by software.

For further explanation, coil currents $I_A$, $I_B$, and $I_C$ are considered (above mentioned bipolar excitation) positive when the coil current $I_A$, $I_B$ or $I_C$ goes from line 101 to star point 105 (the direction of the arrows); and considered negative when the coil current $I_A$, $I_B$, or $I_C$ goes from star point 105 to line 102.

The present invention is suitable for both star (as in FIG. 2) or bridge connection of stator coils 110, 120 and 130. Due to fabrication tolerances, especially low cost electric motors are not perfectly symmetric so that the star potential at point 105 can be slightly shifted from the average potential between line 101 and 102. Since detector 150 preferably measures only voltage differences instead of induced voltages $U_A$, $U_B$, $U_C$ themselves, no exact zero reference is required. This has the advantage that three wires are sufficient to connect coils 110, 120 and 130 to detector 150 since a fourth wire is not required to measure and transmit a star potential. This is particularly advantageous in sealed arrangements, where each wire connection which penetrates the housing is expensive like it is the case for example for refrigerator motors.

FIG. 3 illustrates a simplified time diagram of commutation states (patterns) of the stator excitation (coils 110, 120 and 130) and induced voltages $U_A$, $U_B$, $U_C$ resulting from an actual rotor movement. At the top, FIG. 3 further illustrates control signal 151 of detector 150 in a convenient implementation. The time t is indicated horizontally; the induced voltages $U_A$, $U_B$, and $U_C$ are illustrated vertically.

Time points t(n) ("commutation time points") are defined by commutations between stator states (or "energizing states"). For convenience of further explanation, t(1) is defined as t(1)=0 when the stator is initially energized. The six (i.e. 2*M) different stator states are valid between commutations (vertical dashed lines - - - at t(n)) and defined as follows: State BA beginning at t(1): only switches 121 and 112 conductive, $I_B$ positive, $I_A$ negative, coil C not energized; state CA beginning at t(2) with the commutation BA→CA: only switches 131 and 112 conductive, $I_C$ positive, $I_A$ negative, coil B not energized, state CB beginning at t(3) with the commutation CA→CB: only switches 131 and 122 conductive, $I_C$ positive, $I_B$ negative, coil A not energized; state AB beginning at t(4) with the commutation CB→AB: only switches 111 and 122 conductive, $I_A$ positive, $I_B$ negative, coil C not energized; state AC beginning at t(5) with the commutation AB→AC: only switches 111 and 132 conductive, $I_A$ positive, $I_C$ negative, coil B not energized (more details in FIG. 4); state BC beginning at t(6) with the commutation AC→BC: only switches 121 and 132 conductive, $I_B$ positive, $I_C$ negative, coil A not energized; and so on, in general state XY: only switch X to line 101 and switch Y to line 102 conductive, $I_X$ positive, $I_Y$ negative.

In an example which will be explained in details by FIG. 4, during commutation AB→AC at time point t(5), switch 111 remains conductive, switch 122 becomes non-conductive, and switch 132 becomes conductive. The actual time required to commutate (i.e. the time to operate the switches) is neglected. The state order BA, CA, CB, AB, AC, BC and its repetition define the rotation of $\psi_S$ (cf. FIG. 1) and thereby a movement of the rotor in a first direction. As mentioned above, states and commutations are known by logic 160 at any time.

$U_A$, $U_B$ and $U_C$ are defined by the movement of the rotor relative to the stator rotation. Detector 150 and logic 160 do not know them all the time. As $U_A$, $U_B$ and $U_C$ have an approximately sine shape (cf. FIG. 3). Zero-crossings alternatively occur in two directions. In an event of a first type (symbols ↑A, ↑B or ↑C), $U_A$, $U_B$ or $U_C$ goes from a negative value to a positive value (e.g., in reference to the zero potential at star point 105); and in an event of a second type (symbols ↓A, ↓B or C↓) $U_A$, $U_B$ or $U_C$ goes from a negative value to a positive value. For a ↑event, $dU_A/dt$, $dU_B/dt$ or $dU_C/dt$ is positive, and at the time of an ↓event, $dU_A/dt$, $dU_B/dt$ or $dU_C/dt$ is negative.

The zero-crossing ↓↑events are detected by detector 150 after t(3) when the voltages $U_A$, $U_B$ and $U_C$ reach values which are sufficiently high for monitoring. Control signal 151 goes from logical "0" to "1" for ↑events and from "1" to "0" for ↓events. This convention is convenient for explanation, but not necessary for practicing the present invention. For convenience, zero-crossing events and changes of signal 151 are associated in FIG. 3 by vertical dotted lines ( . . . ).

The "zero time point" of a zero crossing event (i.e. signal 151 toggles) is indicated by "τ(n)", wherein the index n corresponds to the index "n" in t(n) according to $t(n) \leq \tau(n) < t(n+1)$. The symbol "≤" in connection with "t" and/or "τ" stands for "prior to or at the same time".

The time interval between two consecutive zero-crossing events (e.g., between τ(n) and τ(n+1)) is a measure for the rotation speed $d\phi/dt$ of the rotor. For example, the rotor moves by $\phi=2*\pi$ (one full turn) during ↑A and the next ↑A (not illustrated); the rotor moves by $\phi=\pi$ (half turn) during ↑A and ↓A (e.g., τ(6)–τ(3)); the rotor moves by $\phi=\pi/3$ (a sixth of a turn) during ↑A and C↓ (e.g., τ(4)–τ(3)). If the rotor moves in the above mentioned first direction, then events occur in the following order: B↓, A↑, c↓, B↑, A↓ and C↑. The event sequence comprises six events (i.e., 2*M).

Detector 150 monitors zero-crossing events only for coils which are not energized. In the example, detector 150 monitors coil C during state AB, coil B during state AC, coil A during state BC, C during state BA, coil B during state CA, and coil A during state CB. For convenience, the traces illustrating $U_C$, $U_B$, and $U_A$ in FIG. 3 when the respective coils are being monitored are illustrated bolder than the traces of the non-monitored voltages.

When the magnetic field of the rotor $\psi_R$ rotates synchronized to the magnetic field of the stator $\psi_S$, zero-crossing events in the non-energized coils occur in the following standard configuration: B↓ during state CA, A↑ during state CB, C↓ during state AB, B↑ during state AC, A↓ during state BC, and C↑ during state BA and so forth.

In other words, zero-crossing events are synchronized with the commutations (i.e. to the stator states) and time interval ("event time") from a commutation (at t(n)) to a zero-crossing event (at τ(n)) is predetermined. For example, the event time interval (τ(8)–t(8)) between BA→CA (at t(8)) and B↓ (at τ(8)) has a preferred value corresponding to the required field angle $\alpha_{REQUIRED}(\psi_S,\psi_R) \in \{(\pi/2-\pi/6) \ldots (\pi/2+\pi/6)\}$ where the torque has its maximum.

However, during starting up the motor, the zero-crossing events do not necessarily correspond to the stator states where the events are expected. Monitoring the actual occurrence of zero-crossing events of all coils A, B and C, logic 160 can adjust the commutation so that the standard configuration is achieved.

According to the present invention, logic 160 monitors the zero-crossing event within a predetermined monitoring time frame $T_{MONITOR}$ (details in FIG. 4) following a "first" commutation at t(n–1). In a first detection cycle (cycle "(n–1)"), logic 160 detects whether (i) the event occurs prior to the monitoring frame, (ii) the event occurs during the monitoring frame, or (iii) the event does not occur during the monitoring frame. Further, for case (ii), logic 160 records the actual event time point τ(n–1). In a second detection cycle (cycle "n"), logic 160 continues to monitor the next zero-crossing event and, using the information about previous events, schedules commutation time points (e.g., t(n+1)).

Figure 4:
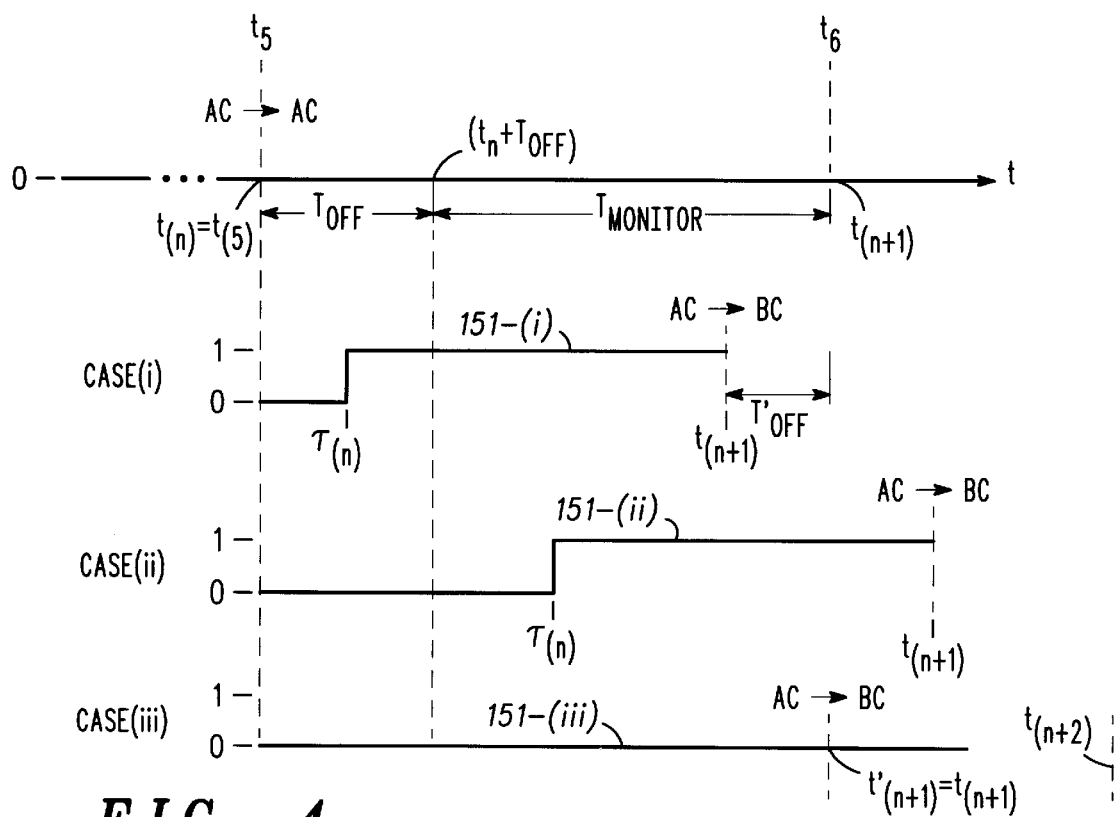
FIG. 4 illustrates a simplified time diagram of a control signal for three distinct cases in the arrangement of FIG. 2 and for two consecutive stator commutations.

FIG. 4 illustrates a simplified time diagram of control signal 151 in the arrangement of FIG. 2 for three distinct cases (i), (ii) and (iii) of possible zero-crossing events and for consecutive commutations (e.g., AB→AC and AC→BC) at different time points. Assume that the example of FIG. 4 illustrates the second cycle.

The horizontal time axis t indicates time t=0, time point t(n) of a "second" commutation (e.g., at t(5), AB→AC) and scheduled time point t(n+1)>t(n) (symbol ">" for "later than", symbol "<" for "prior to"). The "third" commutation (e.g., AC→BC) takes place at time point t'(n+1). The prime marker indicates that the time point t'(n+1) of an actual commutation is eventually different from a previously scheduled time point t(n+1).

In connection with FIGS. 3–4, commutations are counted by "first" at t(n−1) (cf. FIG. 3, e.g., t(4)), "second" at t(n) (cf. FIG. 3 at t(5)), "third" at t(n+1) (cf. FIG. 3 at t(6)) and "fourth" at t(n+2) (cf. FIG. 3 at t(7)). This convention is convenient for explanation, but does not mean that the "first" commutation is not necessarily the "first ever" commutation.

Between the "second" commutation at t(n) and the "third" commutation at t'(n+1), one coil (e.g., coil B) is not energized (not coupled to lines 101 and 102). Similar to FIG. 3, a common vertical dashed line goes through t(n) (e.g., AB→AC) for all cases; and dashed lines go through t'(n+1) (e.g., AC→BC) separate for each case. Time points are indicated by lowercase "t" or "τ"; and time intervals are indicated by uppercase "T"-letters or as the difference between a later time point to an earlier time point. A person of skill in the art can apply the following explanation for other states accordingly.

After the "second" commutation at t(n), the coil current (e.g., $I_B$ in coil B) decreases and reaches a minimum value $I_{MIN}$ (preferably $I_{MIN} \approx 0$) at time point $(t(n)+T_{OFF})$ (vertical dash-dot line -.-). For convenience of explanation, assume that $T_{OFF}$ is a constant. For example, a person of skill in the art can calculate $T_{OFF}$ based on the electrical properties (e.g., inductance) of the coils, measure $T_{OFF}$ or obtain $T_{OFF}$ otherwise. Detector 150 monitors the induced voltage in the non-energized coil (e.g., $U_B$ in coil B) between time points $(t(n)+T_{OFF})$ and t(n+1) (where the "third" commutation is scheduled) forming the limits of monitoring interval $T_{MONITOR}$. Preferably, $T_{OFF}$ amounts to about 30 percent of the total time interval (t(n+1)−t(n)). Other ratios are also possible.

At time point $(t(n)+T_{OFF})$, control signal 151 is either at logical "1" or logical "0" and thereby comprises the information whether the expected event (e.g., B↑, cf. FIG. 3) has already happened or has not yet happened.

Assume that the following case distinction (i), (ii) and (iii) is only valid for time point t(3) or for later time points t(4), t(5), ... (n≧4), because before t(3), any induced voltage $U_A$, $U_B$ or $U_C$ is assumed to be too still to small to be measured by detector 150.

Depending on whether the zero-crossing event happens before, during or after the monitoring interval $T_{MONITOR}$, logic 160 determines the cases (i), (ii) and (iii). Depending on which cases have been determined previously (i.e. after t(n−1) in the first cycle), the next commutation are scheduled. Examples are given later in table 1.

In case (i), control signal 151 has already reached logical "1" before time point $(t(n)+T_{OFF})$ (or even before t(n)). The exact toggling time point τ(n) of signal 151 (e.g., due to event B↑) is not monitored. The (mechanical) rotation of the rotor (and hence the rotor field) is faster than the rotation of the stator field $\psi_S$; angle $\alpha_{ACTUAL}(\psi_S,\psi_R)$ is smaller than $\alpha_{REQUIRED}(\psi_S,\psi_R)$, i.e. $\alpha_{ACTUAL}(\psi_S,\psi_R)<(\pi/2-\pi/6)$. In other words, the stator field $\psi_S$ is lagging behind the rotor field $\psi_R$. As a correction (of a first type), the next commutation (e.g., "third", AC→BC) is advanced to the following time point:

$$t'(n+1)<t(n+1). \tag{1}$$

It is an advantage, that logic 160 can obtain t'(n+1) at the early time point $t(n)+T_{OFF}$.

In case (ii), control signal 151 reaches the monitoring period $T_{MONITOR}$ at logical "0" and toggles to logical "1" (event B↑) at time point $\tau(n)>(t(n)+T_{OFF})$. The time interval (τ(n)−t(n)) between t(n) and τ(n) is a representation of above mentioned angle $\alpha_{ACTUAL}(\psi_S,\psi_R)$. Case (ii) corresponds to the above mentioned standard configuration. The next commutation (e.g., "third", AC→BC) is scheduled to t'(n+1) under consideration of the information obtained in the first cycle to the following time point:

$$t'(n+1)>t(n+1) \tag{2}$$

In case (iii), control signal 151 reaches the monitoring period $T_{MONITOR}$ at logical "0" but stays at logical level until t(n+1) (no event B↑). The rotor field $\psi_R$ rotates at a lower speed than the stator field $\psi_S$ rotates. In other words, angle $\alpha_{ACTUAL}(\psi_S,\psi_R)$ is larger than $\alpha_{REQUIRED}(\psi_S,\psi_R)$, i.e. $\alpha_{ACTUAL}(\psi_S,\psi_R)>(\pi/2+\pi/6)$ and the stator field $\psi_S$ leads. At time point t(n+1), the next commutation (e.g., "third", AC→BC) is performed as scheduled. There is no need to calculate t'(n+1) because t'(n+1)=t(n+1). Also, the following commutation (e.g., "fourth", BC→BA) is scheduled to according to $$t(n+2)>t(n+1). \tag{3}$$

Table 1 illustrates by way of example the calculation of t'(n+1) for cases (i)(n) and (ii)(n) and t'(n+2) for case (iii)(n), second cycle, detected after the "second" commutation at time point t(n) (cf. FIG. 4). As mentioned above, beginning with the "first" commutation at time point t(n−1), previous cases (i)(n−1), (ii)(n−1) and (iii)(n−1), first cycle, have been detected. Table 1 is valid for n≧4. In other words, the detection of previous cases starts at time t(n−1)=t(3) at the earliest. Factor q is in the useful range of $$0.1 \leq q \leq 10 \tag{4}$$

Convenient are values of "2" to the negative or positive power of an integer, like $q=2^{-3}=0.125$. In such a case, the calculation by a low-cost microcomputer is simplified. Factor p is, preferably, related to factor q according to $$p=q+1 \tag{5}$$

This is convenient, but not essential for the present invention. Persons of skill in the art can use other values providing that equations (1),(2) and (3) are in compliance.

TABLE 1

|  | case (i)(n), detect at $t(n) + T_{OFF}$, schedule third commutation | case (ii)(n), detect at $\tau(n)$, schedule third commutation | case (iii)(n), detect at $t(n + 1)$, perform third commutation at $t(n + 1)$, schedule fourth commutation |
|---|---|---|---|
| case (i) (n-1) detect at $t(n - 1) + T_{OFF}$ | (i.i)<br>$t'(n + 1)$<br>=<br>$+p * [t(n) + T_{OFF}]$<br>$-q * [t(n - 1) + T_{OFF}]$ | (ii.i)<br>$t'(n + 1)$<br>=<br>$+p * \tau(n)$<br>$-q * [t(n - 1) + T_{OFF}]$ | (iii.i)<br>$t'(n + 2)$<br>=<br>$+t(n + 1)$<br>$+2 *$<br>$[t(n + 1) - [t(n) + T_{OFF}]]$ |
| case (ii) (n - 1) detect at $\tau(n - 1) + T_{OFF}$ | (i.ii)<br>$t'(n + 1)$<br>=<br>$+p * [t(n) + T_{OFF})]$<br>$-q * \tau(n - 1)$ | (ii.ii)<br>$t'(n + 1)$<br>=<br>$+p * \tau(n)$<br>$-q * \tau(n - 1)$ | (iii.ii)<br>$t'(n + 2)$<br>=<br>$+t(n + 1)$<br>$+2 * [t(n + 1) - \tau(n - 1)]$ |
| case (iii) (n - 1) detect at $t(n)$ | (i.iii)<br>$t'(n + 1)$<br>=<br>$+t(n)$<br>$+p * T_{OFF}$ | (ii.iii)<br>$t'(n + 1)$<br>=<br>$+p * \tau(n)$<br>$-q * t(n)$ | (iii.iii)<br>$t'(n + 2)$<br>=<br>$+t(n + 1)$<br>$+2 * [t(n + 1) - t(n)]$ |

For example, when case (ii) was detected previously after the "first" commutation, and case (i) is detected actually after the "second" commutation, then the "third" commutation is calculated (equation (i.ii)) for t'(n+1) which is the product of p with time interval $[t(n)+T_{OFF}]$ minus the product of q with the previous zero-crossing time-point $\tau(n-1)$.

When in the first "(n-1)" cycle, case (ii) was detected, logic 160 uses the recorded time point $\tau(n-1)$ for calculations (center row with equations (i.ii), (ii.ii) and (iii.ii)) in the second ("n") cycle. Preferably, $\tau(n-1)$ is not used otherwise. This is an advantage of the present invention. When in the first ("n-1") cycle, cases (i) (upper row) or (iii) (lower row) have been detected, logic 160 only uses predetermined information (e.g., p, q, t(n), t(n+1), $T_{OFF}$).

When a previous case distinction (the first "(n-1)" cycle) is not available, then commutations are scheduled according to a modified scheme. For example, when zero-crossing event can be monitored only at or after time point t(3) (cf. FIG. 3, low $U_A$, $U_B$, $U_C$ values). Commutations can be scheduled according to:

case (i): $t'(4)=p*(t(3)+T_{OFF}]$ (6)

case (ii): $t'(4)=p*\tau(3)$ (7)

case (iii): $t'(5)=t(4)+2*t(4)$ (8)

Figure 5:
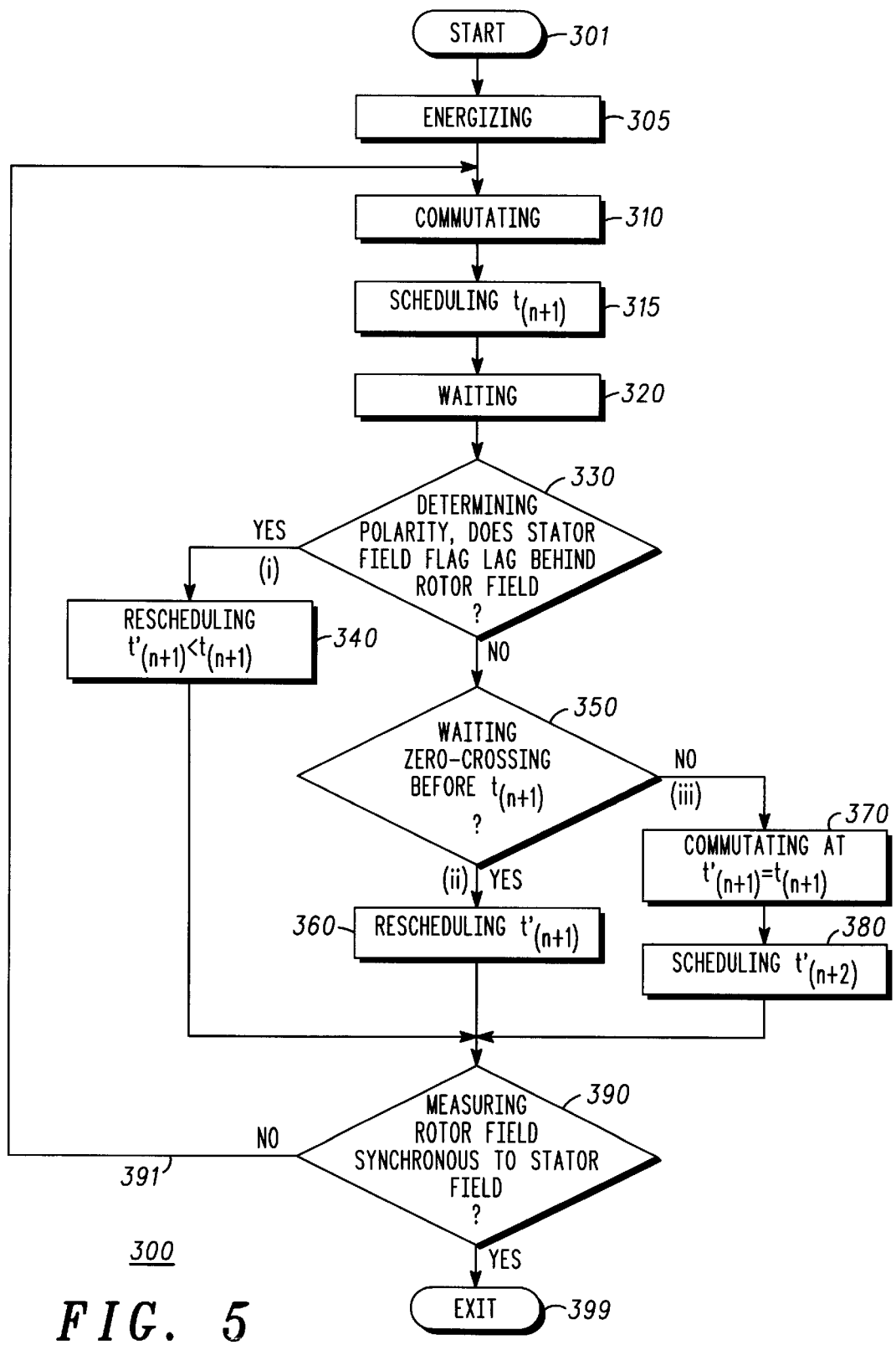
FIG. 5 illustrates a simplified flow chart diagram of a method of the present invention.

FIG. 5 illustrates a simplified flow chart diagram of method 300 of the present invention in reference to arrangement 100 of FIG. 2 and the example of FIG. 4. Persons of skill in the art are able, based on the description herein, to apply method 300 for all possible configurations. Method 300 has start point 301 (t=0, FIG. 4) in which the rotor has an arbitrary position φ in respect to the stator and an unknown rotation speed (preferably standstill dφ/dt=0).

At energizing step 305, logic 160 initializes current flow through coils (e.g., state AB) so that the rotor starts rotating. Step 305 can optionally include a number of stator commutations at time points t(n−2)<t(n−1) in the past (not illustrated in FIG. 4) before t(n). At commutating step 310 at time point t(n) (cf. FIG. 4), logic 160 acting through circuit 140 and the switches suspends the current flow in coil B (AB→AC). In scheduling step 315, logic 160 determines a second time point t(n+1)>t(n) in the future. In waiting step 320, logic 160 waits until time point $(t(n)+T_{OFF})$ where current $I_B$ is expected to be $I_{MIN}=0$. In determining step 330, detector 150 and logic 160 determine the polarity of the voltage $U_B$ generated by the rotation of the magnetic rotor field in coil B. In the example of FIG. 3, this is accomplished by checking the sign of control signal 151. Step 330 answers the question "Does the stator field $\psi_S$ lag behind the rotor field $\psi_R$?" For YES (e.g., $U_B$ positive, control signal 151 at logical "1"), method 300 continues at step 340 (above case (i)). For NO (e.g., $U_B$ negative, control signal 151 at logical "0"), method 300 continues at step 350 (cases (ii) and (iii)). In rescheduling step 340 (case (i), "speed up")), logic 160 schedules the second commutation to t'(n+1)<t(n+1) as explained above. In waiting step 350, detector 150 monitors an eventual zero-crossing of $U_B$ and records time point $\tau(n)$. In other words, step 350 answers the question "Does zero-crossing event B↑ occur during $T_{MONITOR}$ [(t(n)+$T_{OFF}$)<$\tau$<t (n+1)]?" For YES, method 300 continues at step 360 (case (ii)); and for NO, method 300 continues at steps 370 and 380 (case (iii)).

In rescheduling step 360 (case (ii), "standard"), logic 160 schedules the second commutation to t'(n+1) as a function of the actual zero-crossing time point $\tau(n)$ as explained above.

In commutating step 370, logic 160 initiates the next commutation (e.g., AC→BC) at time point t'(n+1)=t(n+1) (as previously scheduled in step 315). In scheduling step 380, (case (iii), "slow down"), logic 160 schedules the following commutation to a more distant time point t'(n+2) (cf. factor 2 in the right columns of table 1). Steps 370 and 380 can be performed in any order. After rescheduling steps 340, 360 or 380, method 300 check an exit condition at measuring step 390 (optional) and continues (line 391) with commutating step 310 (new commutation at time point t'(n+1) for cases (i) and (ii) or at time point t(n+2) for case (iii)). In step 390, logic 160 determines the time between two consecutive zero crossing events (e.g., case (ii), between $\tau$ in state AB and $\tau$ in state BC) and calculates the actual rotor speed dφ/dt. It is also possible to calculate the rotor acceleration $d^2φ/dt^2$ from 3 consecutive zero-crossing events. Such calculations are well known to a person of skill in the art. If the speed (or to the acceleration) of the rotor is substantially equal (usually in an given tolerance range) to the speed (or to the acceleration) of the stator field, then method 300 ends and logic 160 controls the commutation in the conventional way (e.g., like in reference [3]). In other words, step 390 answers the question "Does the rotor rotates (or accelerates) synchronized to the stator field?" with YES at exit 399 and NO on line 391 and step 310.

The present invention can also be described as method 300 for operating a motor having a stator with coils (e.g., coils ABC) which provide a rotating stator field (e.g., $\psi_S$) by being commutated and having a rotor with a magnet which provides a rotor field (e.g., $\psi_R$). Method 300 comprises the steps of: Energizing 305 the stator (e.g., coils A and B) so that the rotor starts rotating; commutating 310 (e.g., AB→AC) the stator at a time point (e.g., t(n)) so that energizing is suspended in at least a part (e.g., coil B) of the stator and scheduling 315 a second, preliminary time point (e.g., t(n+1)); determining 330, in the part (e.g., coil B) of the stator (e.g., coils ABC) and at a predefined time point (e.g., also at t(n)), the polarity of a voltage (e.g., $U_B$) generated by the rotating rotor field (e.g., $\psi_R$); in case of a first polarity (e.g., positive, control signal at "1") of the voltage, which is indicative that the angle (e.g., $\alpha$) between the rotor field (e.g., $\psi_R$) and the stator field (e.g., $\psi_S$) is less than a predefined value, (i) immediately rescheduling 340 the second time point to t'(n+1)<t(n+1); in case of a second polarity (e.g., negative, control signal at "0") of the voltage, waiting 350 (ii) until the voltage crosses zero and rescheduling 360 according to a detected zero-crossing event (i.e., t'(n+1)=f($\tau$(n))), or (iii) until the second, preliminary time point t(n+1), commutating 370 (at t(n+1)) and scheduling 380 a further time point t(n+2)>t(n+1); and repeating 391 the commutating step, the determining and the waiting/rescheduling steps according to a predetermined commutation pattern (e.g., AB→AC) of a predetermined commutation sequence (e.g., AB, AC, BC, BA, CA, CB) taking rescheduled/scheduled time point (t(n+1) cases (i)(ii) and t(n+2) case (iii)).

The present invention can also be described as apparatus 100 for controlling a motor having a stator to provide a rotating stator field and having a rotor to provide a rotor field. The apparatus comprises: means (e.g., circuit 140) for commutating the stator so that energizing is suspended in at least a first part of the stator (e.g., coil B) at a first time point (e.g., t(n)): means (e.g., detector 150) for detecting the polarity and zero-crossing events of a voltage generated by the rotating rotor field in the first part of the stator (i.e. back EMF), and means (e.g., logic 160) for controlling which schedules a second time point (e.g., t(n+1) later than the first time point and which, at a third time point (e.g., t(n)+T$_{OFF}$) between the first and second time point, when the voltage has a first polarity indicative that the angle between the rotor field and the stator field is less than a predefined value, (i) immediately reschedules the second time point to a modified second time point which is earlier than the originally scheduled second time point; when the voltage has a second, opposite polarity, selectively waits until the voltage crosses zero and, (ii) reschedules, according to the time point when the voltage has crossed zero, the second time point to a modified second time point which is later than the originally scheduled second time point, or (iii) waits until the second time point and reschedules the second time point to a modified second time point which is substantially the same as the originally scheduled second time point.

While the invention has been described in terms of particular structures, devices and methods, those of skill in the art will understand based on the description herein that it is not limited merely to such examples and that the full scope of the invention is properly determined by the claims that follow.

I claim:

1. Method for operating a motor having a stator with means for providing a rotating stator field by being commutated and having a rotor with means for providing a rotor field, said method comprising the steps of:
   (a) at a first time point,
      (a1) commutating the stator so that energizing is suspended in at least a first part of said stator and
      (a2) scheduling a second time point later than said first time point;
   (b) at a third time point between said first and second time point, depending on the polarity of a voltage generated by the rotating rotor field in said first part of said stator,
      when said voltage has a first polarity which indicates that the angle between said rotor field and said stator field is less than a predefined value, (i) immediately rescheduling said second time point to a modified second time point which is earlier than the originally scheduled second time point;
      when said voltage has a second, opposite polarity, selectively waiting until said voltage crosses zero and,
         (ii) rescheduling, according to the time point when said voltage has crossed zero, said second time point to a modified second time point which is later than the originally scheduled second time point, or
         (iii) waiting until said second time point and rescheduling said second time point to a modified second time point which is substantially the same as said originally scheduled second time point; and
   (c) repeating steps (a) and (b) according to a predetermined commutation pattern with the remaining second time points as the first time point.

2. The method of claim 1, wherein the time interval between said first time point and said second time point is defined by the time interval the current in said first part needs to reach a predefined minimum value.

3. The method of claim 1, wherein during the repetition (c) of step (b) rescheduling said second time point to a modified second time point for cases (i) and (ii) is based on the original case distinction of said first, second and third cases obtained when step (b) was previously performed.

4. The method of claim 1, wherein during the repetition (c) of sub-step (a2) for case (iii) the second time point is scheduled with a distance larger than the distance between first and second time points in the initial performance of step (a).

5. Method for operating a motor having a stator with coils which provide a rotating stator field by being commutated and having a rotor with a magnet which provides a rotor field, said method comprising the steps of:
   energizing the stator to displace the stator field in respect to the rotor field;
   commutating the stator so that energizing is suspended in at least a first part of said stator;
   monitoring in said first part whether the back EMF crosses a predetermined value before, during or after a first predetermined time frame;
   commutating the stator again so that enerzizing is supended in at least a second, different part of said stator;
   monitoring in said second part whether the back EMF crosses said predetermined value before, during or after a second predetermined time frame; and
   scheduling the next commutation according to information obtained from said first and second monitoring steps.

6. The method of claim 5 wherein in said monitoring steps, the predetermined time frames start with a predetermined delay after commutating.

7. The method of claim 5 wherein in said monitoring steps, the predetermined value is zero and the polarity of the back EMF is monitored.

8. The method of claim 5, characterized in that in said energizing step is performed when the rotor rotates at a predetermined speed.

9. The method of claim 5, characterized in that in said energizing step is performed when the predetermined speed is zero.

10. The method of claim 5 wherein said first and second predetermined time frames are substantially equal.

11. The method of claim 5 wherein in said scheduling step, the next commutation is scheduled according to the actual time point when during the first predetermined time frame the back EMF crossed the predetermined value in said first part.

12. The method of claim 5 wherein in said scheduling step, the next commutation is scheduled according to the actual time point when during the second predetermined time frame the back EMF crossed the predetermined value in said second part.

13. The method of claim 5 wherein in said scheduling step, the next commutation is scheduled according to the actual time points when during the first and the second predetermined time frames, the back EMF crossed the predetermined value in said first and second parts, respectively.

14. Apparatus for controlling a motor having a stator to provide a rotating stator field and having a rotor to provide a rotor field, said apparatus comprising:

means for commutating the stator so that energizing is suspended in at least a first part of said stator at a first time point;

means for detecting the polarity and zero-crossing events of a voltage generated by the rotating rotor field in said first part of said stator, means for controlling which schedules a second time point later than said first time point and which, at a third time point between said first and second time point, when said voltage has a first polarity indicative that the angle between said rotor field and said stator field is less than a predefined value, (i) immediately reschedules said second time point to a modified second time point which is earlier than the originally scheduled second time point;

when said voltage has a second, opposite polarity, selectively waits until said voltage crosses zero and, (ii) reschedules, according to the time point when said voltage has crossed zero, said second time point to a modified second time point which is later than the originally scheduled second time point, or (iii) waits until said second time point and reschedules said second time point to a modified second time point which is substantially the same as said originally scheduled second time point.

* * * * *